Patented Mar. 28, 1950

2,501,914

UNITED STATES PATENT OFFICE 2,501,914

RECOVERY OF SUCROSE FROM MOLASSES

John H. Payne, Honolulu, Territory of Hawaii, assignor to Pacific Chemical & Fertilizer Company, Honolulu, Territory of Hawaii, a corporation of the Territory of Hawaii No Drawing. Application August 13, 1945,
Serial No. 610,661

12 Claims. (Cl. 127—48)

This invention pertains to the recovery of sucrose from molasses and sirups. More particularly my invention relates to the recovery of sucrose from spent cane molasses.

Sucrose molasses is the material which is left after all of the sucrose which can be economically obtained from raw sugar liquors has been recovered. Molasses from various sources vary widely in composition, but it is known that they usually contain from 30% to 60% sucrose together with reducing sugars, such as dextrose and levulose, organic compounds, such as pectins, gums, waxes and nitrogenous compounds, as well as inorganic compounds which are the ash constituents and which are composed largely of potassium, calcium, magnesium and sodium salts. Cane molasses, which is also known as blackstrap molasses, usually contains about 30% sucrose, 20% reducing sugars, 10% ash, 20% organic non-sugar material and about 20% water. Beet molasses usually contains about 50% sucrose, a trace of reducing sugars, 10% ash, 20% organic non-sugar material and about 20% water.

Various sirups made from plant juices or from sugars and carbohydrates usually contain less of the organic compounds other than sugars and less of the ash constituents. In most cases only a portion of the sucrose can be crystallized from such sirups.

From the above analysis of typical cane and beet molasses, it is obvious that a considerable amount of sucrose fails to be recovered in a marketable crystalline sugar form and that this involves a very considerable economic loss. Many attempts have been made to devise a means of extracting this sucrose from waste molasses but with little or no success. In the case of beet molasses it is possible to remove some of the sucrose by means of the Steffens process which involves the precipitation of the sucrose as calcium saccharate. Upon treating a water suspension of the calcium saccharate with carbon dioxide, there is obtained an insoluble precipitate of calcium carbonate and an accompanying liberation of the sucrose which forms a water solution. Upon filtering off the calcium carbonate one may obtain crystalline sucrose from the resulting sugar liquor by means of the usual crystallizing procedure.

In the case of cane molasses the use of the Steffens process is not feasible because of the presence of large amounts of the reducing sugars, dextrose and levulose. Levulose reacts with lime to form calcium levulosate which then precipitates together with the calcium succharate, with the result that upon treating such a precipitate with carbon dioxide one obtains calcium carbonate and a solution of sucrose and levulose. In view of these difficulties the Steffens process has not been commercially applied to cane molasses. I have discovered a means of recovering crystalline sucrose from waste sugar liquors which is particularly applicable to the treatment of cane molasses.

One object of my invention is the recovery of a substantial portion of crystalline sucrose from molasses, particularly from cane molasses.

Another object of my invention is the removal of sucrose from cane molasses without any accompanying substantial removal of reducing sugars.

Still another object of my invention is the removal of organic sucrose-crystallizing inhibitors.

A further object of my invention is the removal of organic sucrose-crystallizing inhibitors by means of water-miscible organic liquids.

Still another object of my invention is the treatment of molasses with organic liquids which are capable of producing a filterable precipitate of organic sucrose-crystallizing inhibitors and are also capable of enabling the removal of a substantial amount of the original moisture in the molasses by means of vacuum distillation without any accompanying molasses solidification.

The ingredients which are mainly responsible for the inability of most of the sucrose to crystallize from molasses are complex materials dissolved in the molasses and which act as sugar-crystallization inhibitors. This material is mostly of an organic nature, consisting of complex gums, pectins, waxes and nitrogenous compounds. In the case of cane molasses, these organic materials constitute about 20% of the molasses, on a commercial basis. I have discovered that a major portion of these organic sugar-crystallizing inhibitors can be precipitated from the molasses by the addition of alkyl ethers of ethylene glycol, such as, for example, ethylene glycol monomethyl ether, which is also known as "methyl Cellosolve." Another suitable material is ethylene glycol monoethyl ether which is also known as "Cellosolve." In referring to these two reagents in the rest of the specification the terms methyl Cellosolve and Cellosolve will be used for the sake of brevity.

I have discovered that methyl Cellosolve not only removes the sugar-crystallizatiton inhibitors, but it removes them in a form in which they can be separated readily from the sirup by filtration or centrifuging without substantial loss of sugars. Some other organic liquids, as for example, acetone, will precipitate most of the colloidal matter from a molasses or sirup but this liquid precipitates large quantities of the sugars at the same time in a sticky gelatinous mass which is practically impossible to separate from the molasses by ordinary means of filtration or centrifuging.

In addition to the factor of the physical form of the precipitate and the fact that no substantial quantities of sugar are lost with the precipitate, of vital importance is the physical nature of the remaining precipitate-free liquor. This liquor is a mixture of the glycol ethers and a water solution of the sugars. Only in solutions of glycol ethers do the optimum physical conditions exist which make possible the direct crystallization of high purity sucrose to the extent of 50-60%. This unique combination of properties is too complex to be understood at this time but involved are the relative boiling point of the liquid to that of water, relative solubilities of the sugars sucrose, dextrose, and fructose in the glycol ether and water, solution and hydration, and the nature of the two component systems, organic liquid-water. The use of other organic liquids produces either sirups from which sucrose will not crystallize, or solidified, non-purgeable massecuites.

I have found methyl Cellosolve which has a boiling point of 124.5° C. to be particularly suitable for the removal of crystalline sucrose from cane molasses. The following example illustrates the use of methyl Cellosolve for the recovery of crystalline sucrose from cane molasses. Data is given in parts by weight.

*Example*

17.52 parts of methyl Cellosolve were added to 5.84 parts of cane molasses which contained 1.81 parts of sucrose. Upon thorough mixing, 0.843 part of a nongelatinous precipitate was formed. This precipitate was removed from the molasses by means of a Sharples centrifuge. The physical form of the precipitate was such that it could be removed by the usual means of filtering or centrifuging. The precipitate was washed with 1.9 parts of methyl Cellosolve and the washings added to the centrifuged molasses liquor. The mother liquor, which was now free of a major portion of organic nonsugar materials which act as sucrose crystallization inhibitors, was vacuum-concentrated until sucrose crystals began to form. The liquor was then cooled and allowed to crystallize for seven days at room temperature. The massecuite was then centrifuged to remove 0.31 part of first sugar dry substance. This first sugar batch was then dried without washing. The greens from the first sugar was vacuum-concentrated to about one-half of its original volume and crystallized by allowing the massecuite to stand for ten days at room temperature. The crystalline sucrose which had formed during this period was removed by centrifuging and amounted to 0.648 part. It was washed with methyl Cellosolve and dried. The washings were returned to the second greens. The mixture of second greens and methyl Cellosolve wash liquor was vacuum-concentrated to about one-half of its volume and crystallized for 20 days at room temperature. The sucrose crystals were removed by centrifuging, washed with methyl Cellosolve and dried. The sugar obtained in the third crystallization amounted to 0.36 part. The total amount of crude sugar recovered was 1.32 parts which represents a yield of about 60% of sucrose based upon the sucrose content of the molasses. The mother liquor remaining after the third crystallization was vacuum-concentrated to recover the remaining methyl Cellosolve, leaving a brown viscous residue containing sucrose, reducing sugars and soluble ash which is mainly potassium chloride.

The following table shows data on the amount of first, second and third sugar obtained, the analysis of the original molasses and the insoluble precipitate, and the purity of the three sugar batches.

TABLE

*Recovery of sucrose from cane molasses by means of methyl Cellosolve*

|  | Original Molasses | Insoluble Precipitate | 1st Sugar | 2nd Sugar | 3rd Sugar |
| --- | --- | --- | --- | --- | --- |
| Amount in Kg | 5.84 | 0.843 | 0.31 | 0.648 | 0.36 |
| Percent Sucrose | 31.0 | 10.4 | 96.2 | 95.8 | 60.0 |
| Percent Reducing Sugar | 22.0 | 6.0 | 1.8 | 2.0 | 2.6 |
| Percent Ash | 11.7 | 33.7 | 0.5 | 0.6 | 33.3 |

Referring to the above table, the sugars obtained from the first and second crystallization were of high purity, high sucrose content and low ash content. They contained over 95% sucrose and were sufficiently pure to be utilizable as a valuable commercial crystalline sucrose product.

The high ash content of the insoluble precipitate indicates that the methyl Cellosolve or other water soluble glycol ethers cause the precipitation of a considerable amount of inorganic salts. This is supported by the fact that the ash in the glycol ether treated molasses consists mainly of soluble chlorides, the major ingredient being potassium chloride. The glycol ether evidently has a selective solvent action on the miscellaneous water soluble ash ingredients and tends to precipitate the nonchloride metal salts, leaving in solution ash material consisting mostly of alkali chlorides. The removal of a substantial amount of soluble ash together with the organic crystallizing inhibitors serves to improve sucrose crystallization, particularly from the standpoint of increased yields of crystalline sugar. The soluble ash material in the molasses tends to decrease the amount of sucrose crystals that may be obtained from the massecuite.

The amount of methyl Cellosolve will vary to some extent with the particular sample of cane molasses. I have found that if the ratio of molasses to methyl Cellosolve is above 1 to 1, there will be obtained a satisfactory degree of precipitation of the organic material which inhibits sucrose crystallization and the physical form of this precipitate will be such that it can be separated by means of ordinary filtration or centrifuging. The physical form of the precipitate, as well as its amount, will vary with the kind and amount of ethylene glycol monoalkyl ether. Tus if one uses Cellosolve, which is ethylene glycol monoethyl ether, the amount of precipitate obtained is considerably greater. In some instances the quantity of precipitate formed with Cellosolve is so great that the mixture becomes difficult to filter and it thereupon becomes necessary to add more liquid to the batch. This liquid can be either water or Cellosolve. If water is added, there usually results a loss in crystalline sucrose yield due to the fact that additional water brings about the dilution of the molasses sucrose solution with accompanying decreased crystallizing efficiency. Because of this I prefer methyl Cellosolve to Cellosolve. One may, however, use any ethylene glycol monoalkyl ether which is water soluble and obtain reasonably good results. Examples of other ethylene glycol monoalkyl ethers which could be used are ethylene glycol monoisopropyl ether and ethylene glycol monobutyl ether.

The reagents as well as the process conditions may be widely varied without departing from the spirit of the invention. Thus instead of centrifuging the organic precipitate from the molasses, this material may be separated by any other suitable means, such as filtration, settling, etc. Instead of centrifuging the crystallized sucrose formed in the first, second and third crystallization, the crystalline sucrose may be separated from the massecuite by filtering. The crystallization of the sucrose out of the treated molasses liquor may be carried out in any convenient manner. The gravity of the massecuite, as well as its temperature during crystallization, will depend upon the particular process conditions under which one is operating. One may obtain the crystalline sucrose from the ethylene glycol monoalkyl ether treated molasses by means of either vacuum pan crystallization or by the crystallization of a massecuite at atmospheric pressure. The amount of sucrose crystallized and the purity of the sucrose will depend upon the amount of moisture present in the molasses treated. In general, the greater the amount of moisture in the molasses, the less the amount of sucrose recovered. In treating a given molasses material, the optimum amount of water and solvent material will depend on the make-up of the individual molasses batch, namely, upon the amount of organic impurities and upon the ash content. While I have found my process to be particularly applicable to cane molasses, the addition of ethylene glycol monoalkyl ethers to other spent sugar liquors may also be used to advantage. Thus beet molasses, hydrol which is the spent liquor from dextrose massecuites, sorghum sirups and spent liquors from wood sugar conversions may all be advantageously processed by means of the ethylene glycol monoalkyl ethers. The amount of refined crystalline sugar material obtained, as well as the particular glycol ether material, temperature, filtration and centrifuging conditions which will be used will depend upon the particular raw material that is being treated.

I claim:

1. A process of removing sucrose-crystallization inhibitors from syrups containing sucrose and such inhibitors which comprises treating said syrup with a sufficient quantity of a monoethylene glycol monoalkyl ether to precipitate said inhibitors and separating the resulting precipitate from the mother liquor.

2. A process of crystallizing sucrose from molasses which comprises admixing said molasses with a sufficient quantity of a monoethlyene glycol monoalkyl ether to precipitate the sucrose-crystallization inhibitors contained therein and separating the resulting precipitate from the mother liquor.

3. The process recited in claim 2 wherein said ether is ethylene glycol monomethyl ether.

4. The process recited in claim 2 wherein said ether is ethylene glycol monoethyl ether.

5. A combination process of separating purified sucrose crystals from a molasses containing sucrose and sucrose-crystallizing inhibiting agents which comprises admixing said molasses with a sufficient quantity of a water soluble monoethylene glycol monoalkyl ether to precipitate sucrose crystallization-inhibiting agents, separating the resulting precipitate from the mother liquor, and thereafter crystallizing sucrose from the mother liquor.

6. The combination process recited in claim 5 wherein the resulting sucrose crystals are separated and at least a portion of them are washed with a quantity of a water soluble monoethylene glycol monoalkyl ether.

7. The combination process recited in claim 5 wherein said precipitate is washed with a water soluble monoethylene glycol monoalkyl ether and the washings are combined with said mother liquor.

8. A combination process of separating purified sucrose crystals from a molasses containing sucrose, other sugars, inorganic salts and organic sucrose-crystallization inhibiting agents which comprises admixing said molasses with at least an equal part by weight of a water soluble monoethylene glycol monoalkyl ether to precipitate said inhibiting agents, separating the resulting precipitate from the mother liquor, washing the precipitate with an additional quantity of said ether, admixing the ether washings with the mother liquor, crystallizing sucrose from said mother liquor in a plurality of successive crystallization steps, and washing the sucrose crystals produced in at least one of said steps with a further quantity of said ether.

9. The combination process recited in claim 8 wherein said ether is ethylene glycol monomethyl ether.

10. The combination process recited in claim 8 wherein said ether is ethylene glycol monoethyl ether.

11. A process of removing sucrose-crystallization inhibitors from syrups containing sucrose and such inhibitors which comprises treating said syrup with at least an equal part by weight of a water soluble monoethylene glycol monoalkyl ether to precipitate said inhibitors and separating the resulting precipitate from the mother liquor.

12. A process of crystallizing sucrose from molasses which comprises admixing said molasses with at least an equal part by weight of a water soluble monoethylene glycol monoalkyl ether to precipitate the sucrose-crystallization inhibitors contained therein, and separating the resulting precipitate from the mother liquor.

JOHN H. PAYNE.

REFERENCES CITED

The following references are of record in the file of this patent:

UNITED STATES PATENTS

| Number | Name | Date |
| --- | --- | --- |
| 2,003,965 | Bloch | June 4, 1935 |
| 2,022,093 | Reich | Nov. 26, 1935 |
| 2,022,824 | Reich | Dec. 3, 1935 |
| 2,130,029 | Reich | Sept. 13, 1938 |
| 2,442,804 | Gaylor | June 8, 1948 |